US011978420B2

(12) United States Patent
Jeon et al.

(10) Patent No.: US 11,978,420 B2
(45) Date of Patent: May 7, 2024

(54) GATE DRIVING DEVICE FOR DRIVING DISPLAY PANEL

(71) Applicant: LX Semicon Co., Ltd., Daejeon (KR)

(72) Inventors: Jae Uk Jeon, Daejeon (KR); Jung Bae Yun, Daejeon (KR); Man Jeong Ko, Daejeon (KR); Byung Seob Song, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/991,353

(22) Filed: Nov. 21, 2022

(65) Prior Publication Data

US 2023/0178048 A1 Jun. 8, 2023

(30) Foreign Application Priority Data

Dec. 7, 2021 (KR) ........................ 10-2021-0173378

(51) Int. Cl.
*G09G 3/3266* (2016.01)
*G09G 3/36* (2006.01)

(52) U.S. Cl.
CPC ......... *G09G 3/3677* (2013.01); *G09G 3/3266* (2013.01)

(58) Field of Classification Search
CPC ............... G09G 3/3677; G09G 3/3266; G09G 2310/066; G09G 2320/0223; G09G 3/3258; G09G 3/3291; G09G 3/3674; G09G 3/3696; G09G 2310/0243; G09G 2310/0267; G09G 2310/0278; G09G 2310/06
See application file for complete search history.

(56) References Cited

U.S. PATENT DOCUMENTS 6,008,801 A * 12/1999 Jeong .................... G09G 3/3688 345/98
8,436,848 B2 * 5/2013 Hsu ....................... G09G 3/3611 345/55
2003/0117566 A1 * 6/2003 Park ..................... G02F 1/13452 349/149
2004/0263452 A1 * 12/2004 Kim ...................... G09G 3/3677 345/87
2005/0088391 A1 * 4/2005 Kim ...................... G09G 3/3677 345/94
2006/0001640 A1 * 1/2006 Lee ....................... G09G 3/3677 345/100
2008/0122826 A1 * 5/2008 Tung ..................... G09G 3/3655 345/98
(Continued)

FOREIGN PATENT DOCUMENTS

KR 20160083565 A 7/2016
KR 20170080350 A 7/2017
KR 102018761 B1 11/2019

OTHER PUBLICATIONS http://www.learningaboutelectronics.com/Articles/Summing-amplifier-circuit.php, Aug. 2015.*

*Primary Examiner* — Jose R Soto Lopez
(74) *Attorney, Agent, or Firm* — ROTHWELL, FIGG, ERNST & MANBECK, P.C.

(57) ABSTRACT

Provided is a technology capable of consistently and stably forming a slope of a gate pulse modulation waveform by discharging a gate line by a predetermined current by using a regulator and the like in gate pulse modulation.

20 Claims, 11 Drawing Sheets

600a

(56) References Cited

U.S. PATENT DOCUMENTS

| | | | | |
|---|---|---|---|---|
| 2009/0189883 | A1* | 7/2009 | Chung | G09G 3/3674<br>345/213 |
| 2012/0133634 | A1* | 5/2012 | Her | H03F 1/0211<br>345/212 |
| 2014/0028652 | A1* | 1/2014 | Lin | G09G 3/20<br>345/212 |
| 2014/0285462 | A1* | 9/2014 | Lee | G06F 3/0416<br>345/173 |
| 2015/0188431 | A1* | 7/2015 | Cho | G09G 3/3225<br>345/212 |
| 2016/0293106 | A1* | 10/2016 | Seo | G09G 3/20 |
| 2019/0340995 | A1* | 11/2019 | Miyata | G09G 3/3688 |
| 2020/0035162 | A1* | 1/2020 | In | H10K 59/131 |
| 2021/0256898 | A1* | 8/2021 | Kim | G09G 3/2003 |
| 2021/0375212 | A1* | 12/2021 | Kwon | G09G 3/3266 |
| 2021/0375214 | A1* | 12/2021 | Kim | G09G 5/10 |
| 2021/0383760 | A1* | 12/2021 | In | G09G 3/3266 |
| 2022/0334604 | A1* | 10/2022 | Kim | G09G 3/3225 |
| 2023/0025117 | A1* | 1/2023 | Kim | G05F 1/565 |

* cited by examiner

GATE DRIVING DEVICE FOR DRIVING DISPLAY PANEL

CROSS REFERENCE TO RELATED APPLICATION

This application claims priority to Republic of Korea Patent Application No. 10-2021-0173378 filed on Dec. 7, 2021, which is hereby incorporated by reference in its entirety.

BACKGROUND

1. Field of Technology

The present disclosure relates to a display panel driving technology.

2. Related Technology

As the information society is advanced, demands for a display device for displaying information are also increasing.

The display device may include a display panel and a panel driving device. The display panel may be, for example, an organic light emitting diode (OLED) panel, a liquid crystal display (LCD) panel, and the like, and the panel driving device may be a device that drives such a display panel.

The panel driving device may include a data driving device called a source driver, a column driver, and the like, a gate driving device called a gate driver, and the like, a data processing device called a timing controller, and the like.

In the display panel, a plurality of gate lines may be disposed in one direction and a plurality of data lines may be disposed in a direction intersecting the gate lines. Furthermore, a pixel may be defined according to the intersection of the gate line and the data line. Furthermore, in the pixel, a pixel element whose brightness is adjusted may be disposed. The pixel element may be composed of, for example, an OLED, and may be composed of a liquid crystal element.

The data driving device may generate a data voltage according to image data indicating the brightness of the pixel, and supply the generated data voltage to the data line. When the data line is connected to the pixel element according to a scan signal supplied to the gate line, the data voltage may be supplied to the pixel element, and the brightness of the pixel element may be adjusted according to the data voltage.

The data line may be connected to the pixel element through a scan transistor, and the gate driving device may control the connection between the data line and the pixel element by controlling ON/OFF of the scan transistor.

The data processing device may process the image data to supply the processed image data to the data driving device, and control the operation timing of the data driving device and the gate driving device.

Meanwhile, the display device is required to increase in size, to have high resolution, and to decrease in weight. In order to meet such these trends, simplification and high speed of circuits constituting the panel driving device are required, the reliability of a circuit operation is required, and robustness against noise of the circuits are required.

The discussions in this section are only to provide background information and do not constitute an admission of prior art.

SUMMARY

Under such a background, in an aspect, various embodiments are directed to providing solutions to the aforementioned problems. In another aspect, various embodiments are directed to providing a circuit technology of a panel driving device that meets the development trend of a display panel. In still another aspect, various embodiments are directed to providing a technology of stably controlling the waveform of a scan signal generated by a gate driving device.

An embodiment may provide a gate driving device, which drives a gate line electrically connected to a pixel, comprising: a gate high voltage supply circuit configured to supply a gate high voltage to anode electrically connected to the gate line; and a linear regulator circuit electrically connected to the node and configured to discharge the gate line by a regulated voltage.

The linear regulator circuit may be supplied with a reference voltage and operate such that a voltage of its one side is regulated in conformity with the reference voltage. A resistance element may be disposed between the node and the one side.

Another embodiment may provide a gate driving device, which drives a gate line electrically connected to a pixel, comprising: a gate high voltage supply circuit configured to supply a gate high voltage to a node electrically connected to the gate line; a resistance element connected with the node in its one side; and a gate line discharge circuit including a transistor connected with the other side of the resistance element in its one side and an amplifier having a first input terminal electrically connected with the one side of the transistor, a second input terminal electrically connected with a reference voltage, and an output terminal electrically connected to a gate of the transistor.

The other side of the transistor may be electrically connected with a gate low voltage source.

The resistance element may be the transistor or other transistors.

Still another embodiment may provide a gate driving device, which drives gate lines electrically connected to pixels, comprising: a first gate driving circuit configured to supply a scan signal to a first node electrically connected to a first gate line and to discharge the first gate line by a voltage regulated according to a first reference voltage; and a second gate driving circuit configured to supply a scan signal to a second node electrically connected to a second gate line and to discharge the second gate line by a voltage regulated according to a second reference voltage.

Each of the first gate driving circuit and the second gate driving circuit may form the regulated voltage by a low-dropout (LDO) circuit.

As is apparent from the above, according to the present embodiments, it is possible to implement a panel driving device that meets the development trend of a display panel. Furthermore, according to the present embodiments, it is possible to stably control the waveform of a scan signal generated by a gate driving device and, even when a plurality of gate driving circuits divide a display panel into a plurality of blocks and drive the display panel, it is possible to implement a high-definition screen without causing a deviation for each block.

DETAILED DESCRIPTION OF EMBODIMENTS

Figure 1:
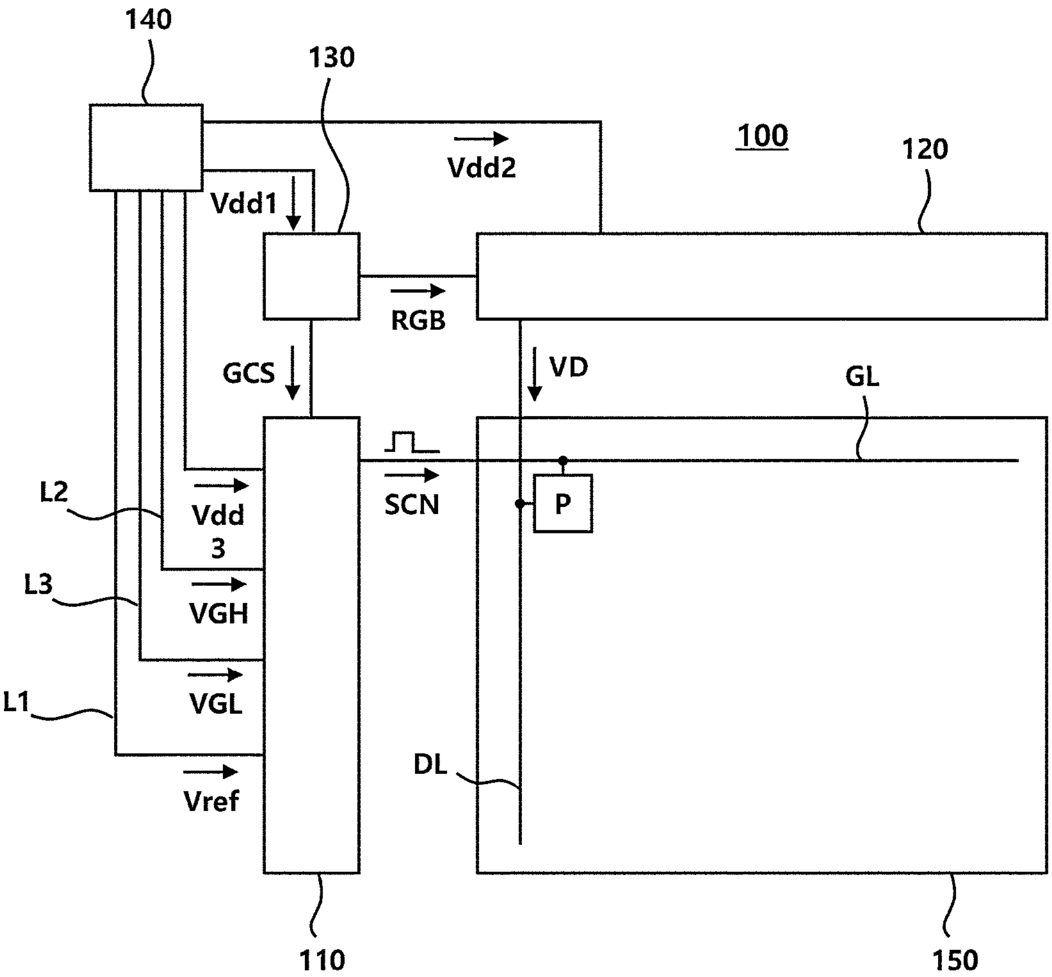
FIG. 1 is a configuration diagram of a display device in accordance with an embodiment.

FIG. 1 is a configuration diagram of a display device in accordance with an embodiment.

Referring to FIG. 1, a display device 100 may include a gate driving device 110, a data driving device 120, a data processing device 130, a power supply device 140, a display panel 150, and the like.

In the display panel 150, a plurality of gate lines GL may be disposed in one direction, for example, a horizontal direction, and a plurality of data lines DL may be disposed in a direction intersecting the gate lines GL, for example, a vertical direction. Furthermore, a pixel P may be defined according to the intersection of the gate line GL and the data line DL.

In the pixel P, a pixel element whose brightness is adjusted may be disposed. The pixel element may include, for example, an organic light emitting diode (OLED), and may include a liquid crystal element. A display panel including the OLED is called an OLED panel, and a display panel including the liquid crystal element is called a liquid crystal display (LCD) panel.

The data driving device 120 may generate a data voltage VD according to image data RGB indicating the brightness of the pixel P, and supply the generated data voltage VD to the data line DL. When the data line DL is connected to a pixel element according to a scan signal SCN supplied to the gate line GL, the data voltage VD is supplied to the pixel element and the brightness of the pixel element may be adjusted according to the data voltage VD.

The data line DL may be connected to the pixel element through a scan transistor, and the gate driving device 110 may control the connection between the data line DL and the pixel element by controlling ON/OFF of the scan transistor.

The gate driving device 110 may receive a gate high voltage VGH and a gate low voltage VGL from the power supply device 140, and generate the waveform of the scan signal SCN by using the gate high voltage VGH and the gate low voltage VGL.

The scan signal SCN may have a voltage level corresponding to the gate high voltage VGH in some sections and a voltage level corresponding to the gate low voltage VGL in the remaining sections. The scan transistor disposed in the pixel may be turned on when the scan signal SCN has a voltage level of the gate high voltage VGH, and may be turned off when the scan signal SCN has a voltage level of the gate low voltage VGL.

The gate driving device 110 may modulate the waveform of the scan signal SCN. The gate driving device 110 may receive a reference voltage Vref from the power supply device 140, and modulate the waveform of the scan signal SCN by using reference voltage Vref.

For example, the gate driving device 110 may further put a portion, which is gradually switched from the gate high voltage VGH to the gate low voltage VGL, into the scan signal SCN.

A portion of the scan signal SCN, which has a voltage level higher than a turn-on voltage of the scan transistor, may be called a gate pulse, and the aforementioned modulation modifies the waveform of the gate pulse and thus is also called gate pulse modulation (GPM).

The data processing device 130 may receive original image data from an exterior, for example, a host device, process the original image data into the image data RGB suitable for the data driving device 120, and then transmit the image data RGB to the data driving device 120.

The data processing device 130 may control the operation timings of the data driving device 120 and the gate driving device 110. The data processing device 130 may control the gate driving device 110 by transmitting a gate control signal GCS to the gate driving device 110. The gate control signal GCS may include a signal that controls the timing of the scan signal SCN.

The power supply device 140 may supply power to panel driving devices. The power supply device 140 may supply, for example, first driving power Vdd1 to the data processing device 130, supply second driving power Vdd2 to the data driving device 120, and third driving power Vdd3 to the gate driving device 110.

The power supply device 140 may supply the reference voltage Vref to the gate driving device 110 through a first line L1, supply the gate high voltage VGH to the gate driving device 110 through a second line L2, and supply the gate low voltage VGL to the gate driving device 110 through a third line L3.

Meanwhile, the gate driving device 110 may include a plurality of gate driving circuits, and drive one block of the display panel 150 through each gate driving circuit. For example, the display panel 150 may be divided into N blocks (N is a natural number equal to or greater than 2), and a first gate driving circuit may supply the scan signal SCN to the uppermost first block and an $N^{th}$ gate driving circuit may supply the scan signal SCN to the lowermost $N^{th}$ block.

In such a case, when each gate driving circuit receives an unstable reference voltage Vref due to a line resistance or voltage fluctuations for each position, a GPM waveform may be unstable and an abnormality may appear on a screen in some blocks. Accordingly, the gate driving device in accordance with an embodiment of the present disclosure includes configurations capable of solving such problems.

Figure 2:
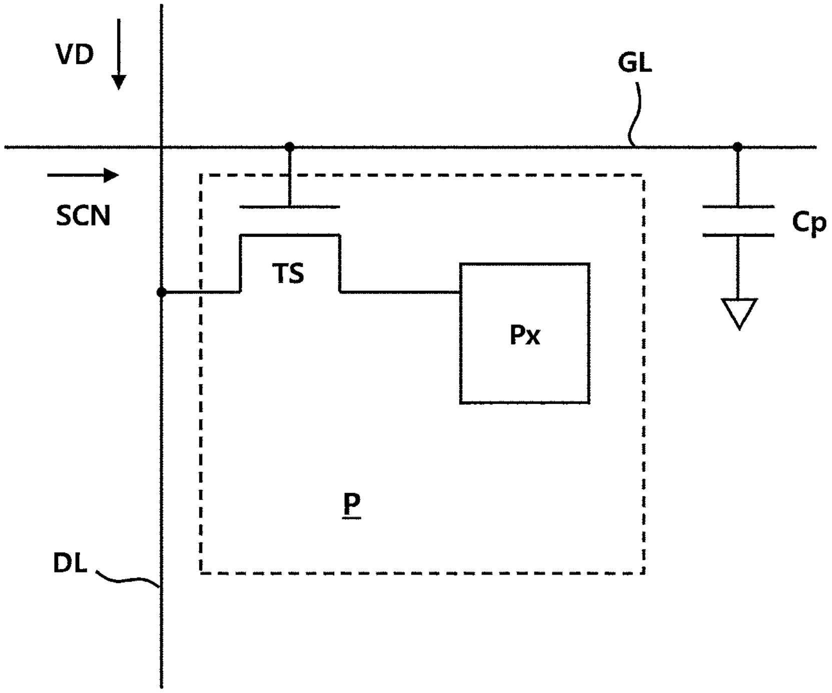
FIG. 2 is a diagram illustrating a configuration of a pixel in accordance with an embodiment.

FIG. 2 is a diagram illustrating a configuration of a pixel in accordance with an embodiment.

Referring to FIG. 2, the pixel P may include a scan transistor TS and a pixel element Px.

The scan signal SCN is supplied to the gate line GL, and when a voltage level higher than that of a turn-on voltage of the scan transistor TS is formed in the scan signal SCN, the scan transistor TS may be turned on. The voltage level of the scan signal SCN may be higher than the turn-on voltage at the time at which the aforementioned gate pulse is supplied, and may be lower than the turn-on voltage at the other times.

A parasitic capacitor Cp may be formed between the gate line GL and a peripheral electrode, and when a signal having a predetermined voltage level is supplied to the gate line GL, such a predetermined voltage level may be stored in the parasitic capacitor Cp. For example, when a signal having the gate high voltage VGH is supplied to the gate line GL, such a gate high voltage may be stored in the parasitic capacitor Cp, and thus, the turn-on of the scan transistor TS may be maintained.

When the scan transistor TS is turned on, the data line DL and the pixel element Px may be connected and the data voltage VD may be supplied to the pixel element Px.

When the supply of the data voltage VD to one pixel P is completed, a voltage lower than the turn-on voltage of the scan transistor TS may be supplied to the gate line GL and the scan transistor TS may be turned off. Then, the data line DL and the pixel element Px may be disconnected from each other.

Since the parasitic capacitor Cp is formed on the gate line GL, when a gate low voltage is supplied to the gate line GL immediately after a gate high voltage is supplied to the gate line GL, charges stored in the parasitic capacitor Cp may be rapidly discharged, causing bad effects on the circuits such as electro-magnetic interference (EMI).

In order to substantially prevent such problems, the gate driving device may supply a gate high voltage to the gate line GL, and then, modulate a gate pulse so that the voltage of the gate line GL is gradually reduced from the gate high voltage to a reference voltage.

The gate driving device may discharge the charge of the parasitic capacitor Cp by using a discharge circuit in order to change the voltage of the gate line GL from the gate high voltage to the reference voltage, wherein the speed of the discharge—in another aspect, the waveform slope of a scan signal showing that the voltage is changed from the gate high voltage to the reference voltage—may vary depending on the capacitance of the parasitic capacitor Cp and the amount of discharge current of the discharge circuit.

Figure 3:
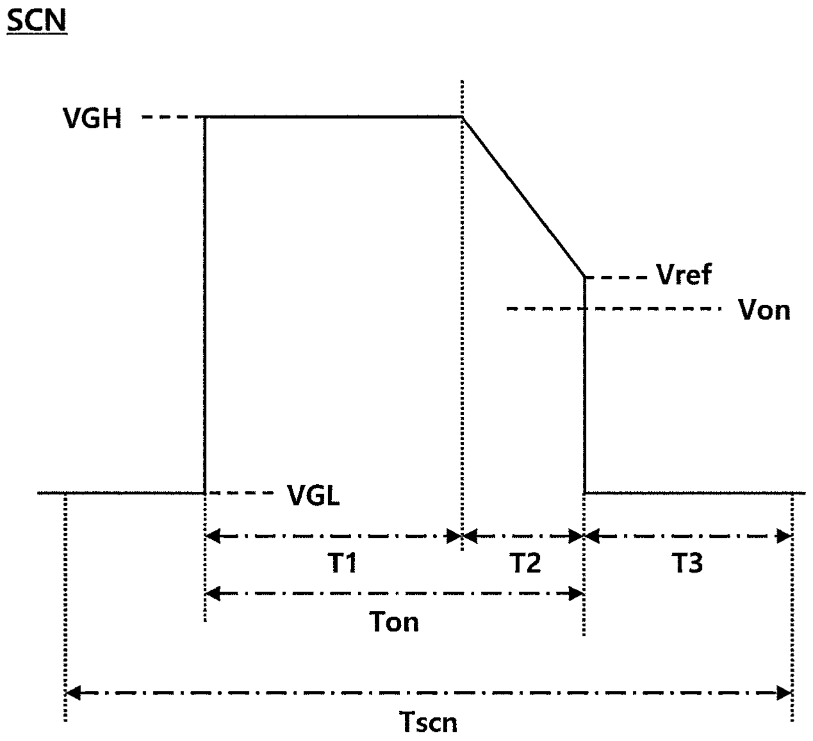
FIG. 3 is a diagram illustrating the waveform of a scan signal to which gate pulse modulation is applied.

FIG. 3 is a diagram illustrating the waveform of a scan signal to which gate pulse modulation is applied.

Referring to FIG. 3, the scan signal SCN may maintain the gate low voltage VGL at an initial time in a scan time Tscn, and have a voltage higher than a turn-on voltage Von during a turn-on time Ton.

For example, the scan signal SCN may have a waveform having the gate high voltage VGH at a first time T1 of the turn-on time Ton and changed from the gate high voltage VGH to the reference voltage Vref at a second time T2. The reference voltage Vref may be a voltage higher than the turn-on voltage Von.

At a third time T3 after the turn-on time Ton, the scan signal SCN may have the gate low voltage VGL.

Meanwhile, at the second time T2, the waveform slope and final voltage of the scan signal SCN may be affected by the reference voltage Vref, the parasitic resistance and parasitic capacitor of the gate line, the discharge circuit, and the like, and may have various values according to such influence factors.

Figure 4:
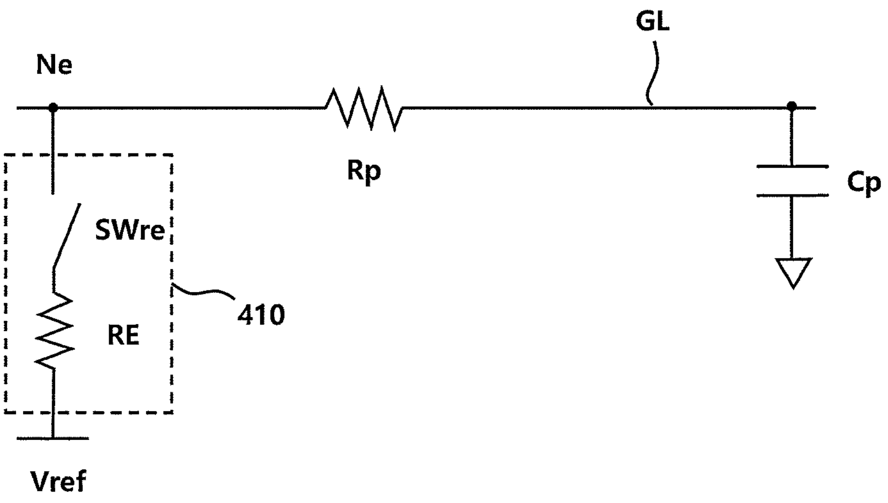
FIG. 4 is a diagram for explaining factors affecting the gate pulse modulation.

FIG. 4 is a diagram for explaining factors affecting the gate pulse modulation.

Referring to FIG. 4, a parasitic resistance Rp and the parasitic capacitor Cp may be formed on the gate line GL. Furthermore, a discharge circuit 410 that modulates the scan signal by discharging the gate line GL may be connected to a discharge node Ne. The discharge node Ne is a node that is electrically connected to the gate line GL and electrically connected to the discharge circuit 410.

The discharge circuit 410 may include a discharge switch SWre and a discharge resistance RE. One side of the discharge resistance RE may be connected to the discharge switch SWre and the other side of the discharge resistance RE may be connected to the reference voltage Vref. When the discharge switch SWre is turned on, the one side of the discharge resistance RE may be connected to the discharge node Ne, charges stored in the gate line GL may be discharged through the discharge resistance RE, and the voltage of the gate line GL may be gradually reduced.

One factor affecting the voltage change of the gate line GL may be the capacitance of the parasitic capacitor Cp. When the capacitance of the parasitic capacitor Cp is large, the slope of the voltage change may be gentle and when the capacitance of the parasitic capacitor Cp is small, the slope of the voltage change may be steep.

Another factor affecting the voltage change of the gate line GL may be the resistance value of the parasitic resistance Rp. When the resistance value of the parasitic resistance Rp is large, the slope of the voltage change may be gentle and when the resistance value of the parasitic resistance Rp is small, the slope of the voltage change may be steep.

Further another factor affecting the voltage change of the gate line GL may be the voltage level of the reference voltage Vref, fluctuations in the reference voltage Vref, and the like. When the voltage level of the reference voltage Vref is high, the slope of the voltage change may be gentle and when the voltage level of the reference voltage Vref is low, the slope of the voltage change may be steep. When the reference voltage Vref fluctuates, the voltage change may also fluctuate.

The voltage level of the reference voltage Vref may affect the final voltage of the modulation, and when the voltage level of the reference voltage Vref is low, the final voltage of the modulation may also be lowered.

Figure 5:
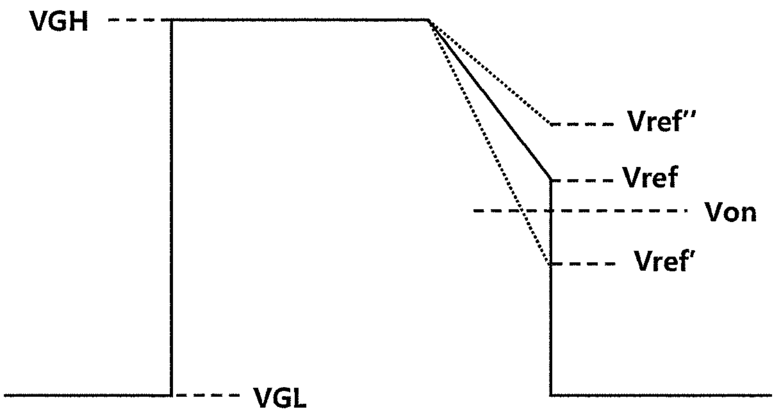
FIG. 5 is a diagram illustrating a change in a modulation waveform according to fluctuations in a reference voltage.

FIG. 5 is a diagram illustrating a change in a modulation waveform according to fluctuations in a reference voltage.

One gate driving circuit may receive a low reference voltage Vref according to the line resistance of the first line that supplies the reference voltage or according to the noise of the first line, and another gate driving circuit may receive a high reference voltage Vref".

In such a case, the one gate driving circuit may generate a scan signal having a final voltage of the modulation lower than the turn-on voltage Von. When such a scan signal is supplied to the gate line, the turn-on time of the scan transistor is shortened, which may cause an abnormality in image quality.

Furthermore, the other gate driving device may generate a scan signal having a high final voltage of the modulation, and such a scan signal may not be normally modulated and may cause side effects such as EMI.

The gate driving circuit in accordance with an embodiment can stably modulate the scan signal so that such problems do not occur.

Figure 6A:
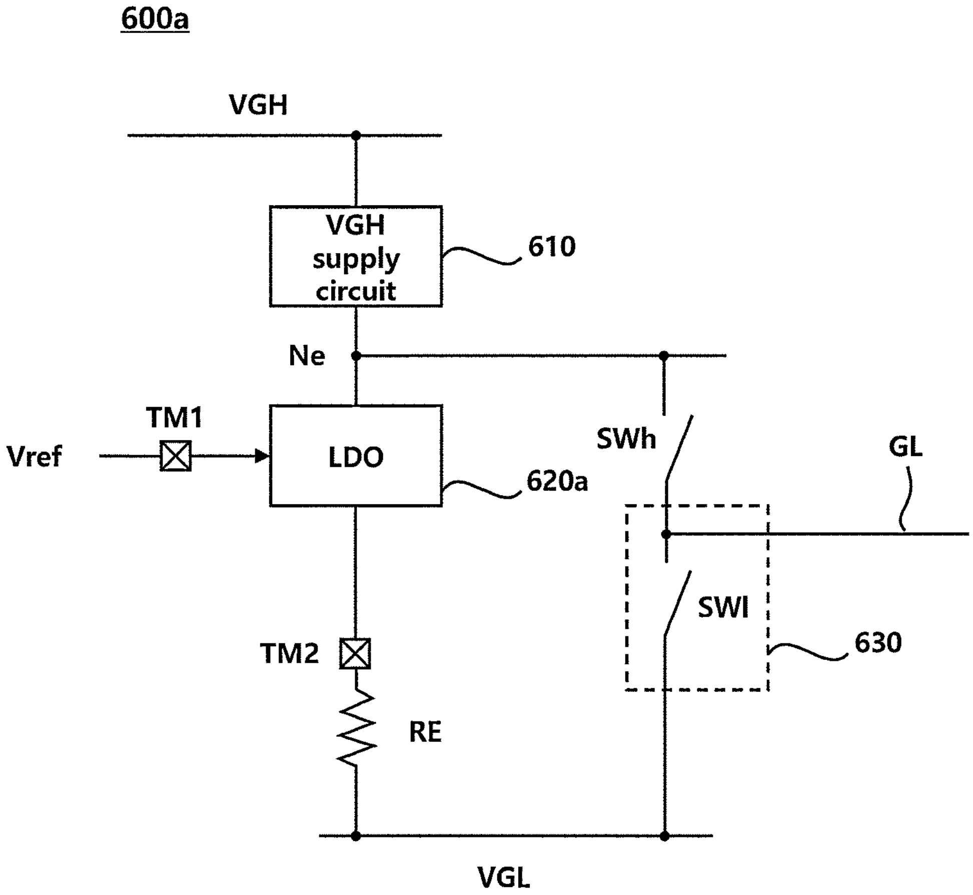
FIG. 6A is a configuration diagram of a first example of a gate driving device in accordance with an embodiment.

FIG. 6A is a configuration diagram of a first example of a gate driving device in accordance with an embodiment.

Referring to FIG. 6A, a gate driving device 600*a* may comprise a gate high voltage supply circuit (VGH supplier) 610, a linear regulator circuit 620*a*, and the like.

The gate high voltage supply circuit 610 may supply the gate high voltage VGH to the discharge node Ne electrically connected to the gate line GL.

The linear regulator circuit 620*a* has a first end to which the discharge resistance RE is electrically connected and a second end to which the discharge node Ne is electrically connected.

The linear regulator circuit 620*a* may be a low dropout (LDO) circuit, but may be another type of regulator circuit.

The linear regulator circuit 620*a* may receive the reference voltage Vref and operate so that a voltage of the second end is regulated in conformity with the reference voltage Vref.

When the voltage of the second end is regulated in conformity with the reference voltage Vref, the amount of current flowing through the discharge resistance RE may be maintained to be constant, and thus, the waveform of the scan signal, particularly, the slope in the modulation may have a constant shape.

Furthermore, since the discharge current through the discharge resistance RE does not flow into a line for supplying the reference voltage Vref, but flows into a line for supplying the gate low voltage VGL, the discharge current does not change the reference voltage Vref.

Furthermore, since the linear regulator circuit 620*a* uses the reference voltage Vref only for reference, the amount of the current of a line that supplies the reference voltage Vref is reduced and a voltage drop of the reference voltage Vref due to the line resistance hardly ever occurs.

For these reasons, the gate driving circuit in accordance with an embodiment can maintain the waveform of the scan signal in a constant shape.

Meanwhile, the supply source of the reference voltage Vref, for example, a power supply circuit, may be externally disposed, and may be connected to the linear regulator circuit 620*a* through a first external connection terminal TM1. A user may also change the level of the reference voltage Vref through the supply source externally disposed.

The discharge resistance RE may be externally disposed to be connected to a supply source of the gate low voltage VGL, and may be connected to the linear regulator circuit 620*a* through a second external connection terminal TM2. The user may also change the resistance value of the discharge resistance RE externally disposed.

The discharge node Ne may be connected to the gate line GL through a high voltage switch SWh. When the high voltage switch SWh is turned on, the discharge node Ne may be connected to the gate line GL, and when the high voltage switch SWh is turned off, the discharge node Ne may be electrically disconnected from the gate line GL.

The gate driving device 600*a* may further comprise a gate low voltage supply circuit 630 that supplies the gate low voltage VGL to the gate line GL.

The gate low voltage supply circuit 630 may comprise a low voltage switch SW1 that connects the gate line GL and the supply source of the gate low voltage VGL.

The gate low voltage supply circuit 630 may supply the gate low voltage VGL to the gate line GL by turning on the low voltage switch SW1, and disconnect the gate line GL from the supply source of the gate low voltage VGL by turning off the low voltage switch SW1.

Figure 6B:
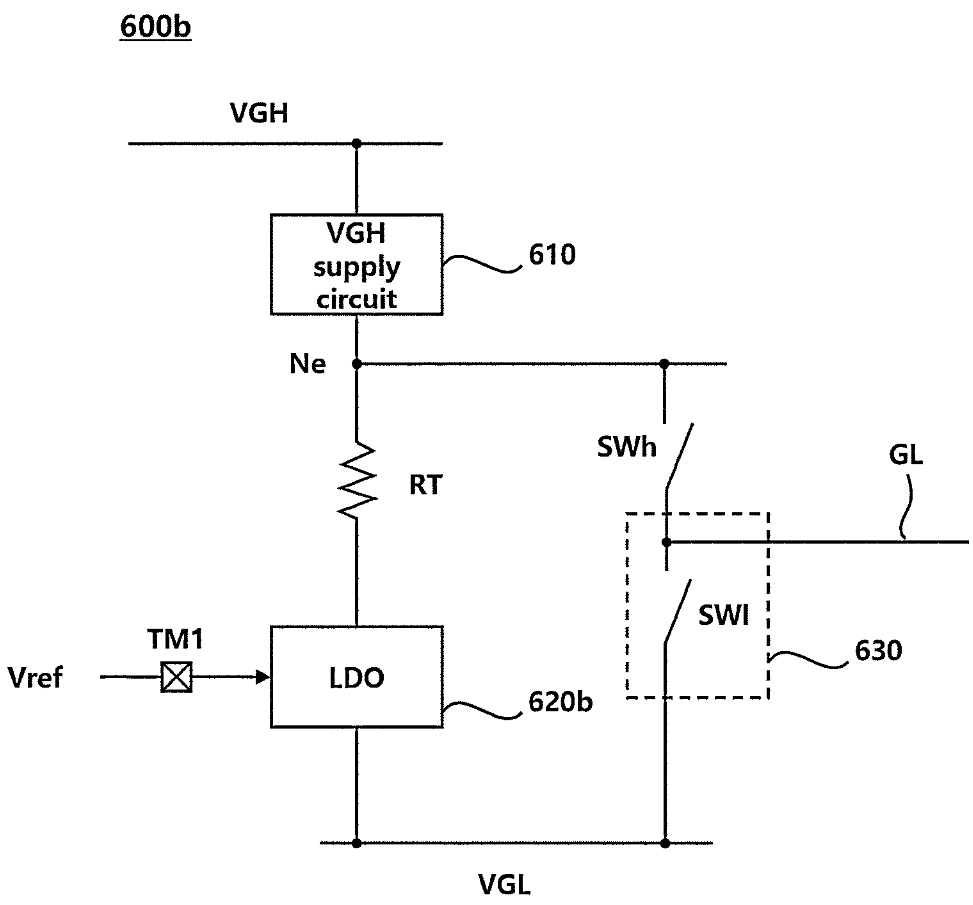
FIG. 6B is a configuration diagram of a second example of a gate driving device in accordance with an embodiment.

FIG. 6B is a configuration diagram of a second example of a gate driving device in accordance with an embodiment.

Referring to FIG. 6B, a gate driving device 600*b* may comprise a gate high voltage supply circuit 610 and a linear regulator circuit 620*b*.

The gate high voltage supply circuit 610 may supply a gate high voltage VGH to a discharge node Ne electrically connected with a gate line GL.

A resistance element RT may be connected to the discharge node Ne.

The linear regulator circuit 620*b* is electrically connected with the resistance element RT in its one side and with a gate low voltage VGL in its other side.

The linear regulator circuit 620*b* may be a low-dropout (LDO) circuit or a regulator circuit in another type.

The linear regulator circuit 620*b* may be supplied with a reference voltage Vref and operate such that a voltage of its one side is regulated in conformity with the reference voltage Vref.

When a voltage of the one side of the linear regulator circuit 620*b* is regulated in conformity with the reference voltage Vref, the amount of current flowing into the resistance element RT may be constantly maintained and a waveform of a scan signal, in particular, a slope in modulation may have a constant form.

Additionally, since a discharge current through the resistance element RT does not flow into a line for supplying the reference voltage Vref, but flows into a line for supplying the gate low voltage VGL, the discharge current does not change the reference voltage Vref.

Further, since the linear regulator circuit 620*b* uses the reference voltage Vref only as a reference, the amount of current in the line for suppling the reference voltage Vref is reduced, and thus, a voltage drop of the reference voltage Vref due to a line resistance would hardly ever occur.

For the reasons described above, the gate driving device according to an embodiment may maintain a waveform of a scan signal to be constant.

A source of the reference voltage Vref, for example a power supply circuit, may be disposed outside and connected with the linear regulator circuit 620*b* through a first external connection terminal TM1. A user may change the level of the reference voltage Vref by using the source disposed thereoutside.

The resistance element may be a resistor as a passive element or may be implemented in a form of a transistor.

The discharge node Ne may be connected with the gate line GL through a high voltage switch SWh. When the high voltage switch SWh is turned on, the discharge node Ne may be connected with the gate line GL and when the high voltage switch SWh is turned off, the discharge node Ne may be electrically disconnected from the gate line GL.

The gate driving device 600*b* may further comprise a gate low voltage supply circuit 630 to supply a gate low voltage VGL to the gate line GL.

The gate low voltage supply circuit 630 may comprise a low voltage switch SW1 that connects the gate line GL and a source for supplying the gate low voltage VGL.

The gate low voltage supply circuit 630 may supply the gate low voltage VGL to the gate line GL by turning on the low voltage switch SW1 and disconnect the gate line GL from the source for supplying the gate low voltage VGL by turning off the low voltage switch SW1.

Figure 7:
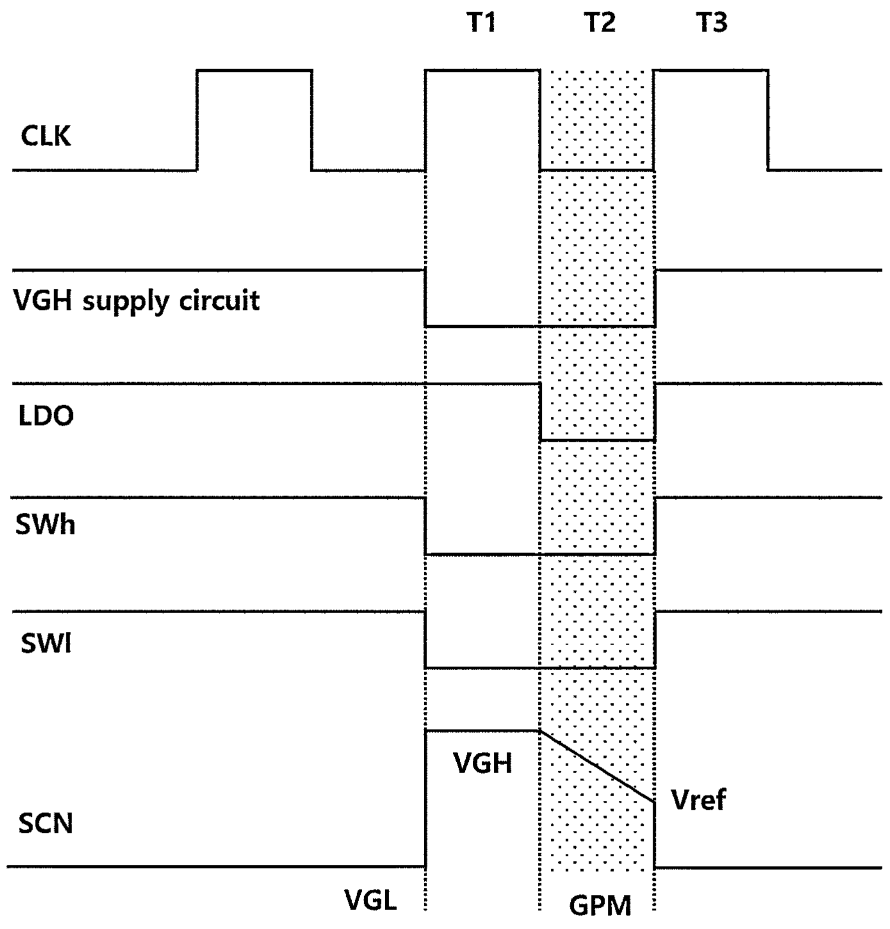
FIG. 7 is a diagram illustrating main waveforms of the examples in accordance with FIG. 6A and FIG. 6B.

FIG. 7 is a diagram illustrating main waveforms of the examples in accordance with FIG. 6A and FIG. 6B.

Referring to FIG. 7, the gate high voltage supply circuit may operate at the first time T1 of a clock CLK of the scan time for the pixel. Furthermore, the linear regulator circuit may operate at the second time T2 of the scan time. In accordance with an embodiment, the gate high voltage supply circuit may also operate at the second time T2.

At the first time T1, the high voltage switch SWh may be turned on, the discharge node may be connected to the gate line, and the gate high voltage VGH supplied by the gate high voltage supply circuit may be supplied to the gate line.

At the second time T2, the turn-on of the high voltage switch SWh may be maintained, the discharge node may continuously be connected to the gate line, the gate line may be discharged by the linear regulator circuit, and the voltage of the gate line may be reduced from the gate high voltage VGH to the reference voltage Vref. This time is also called a GPM time.

As the low voltage switch SW1 is turned off at the first time T1 and the second time T2 and then is turned on at the third time T3 subsequent to the second time T2, the gate low voltage VGL may be supplied to the gate line.

Figure 8A:
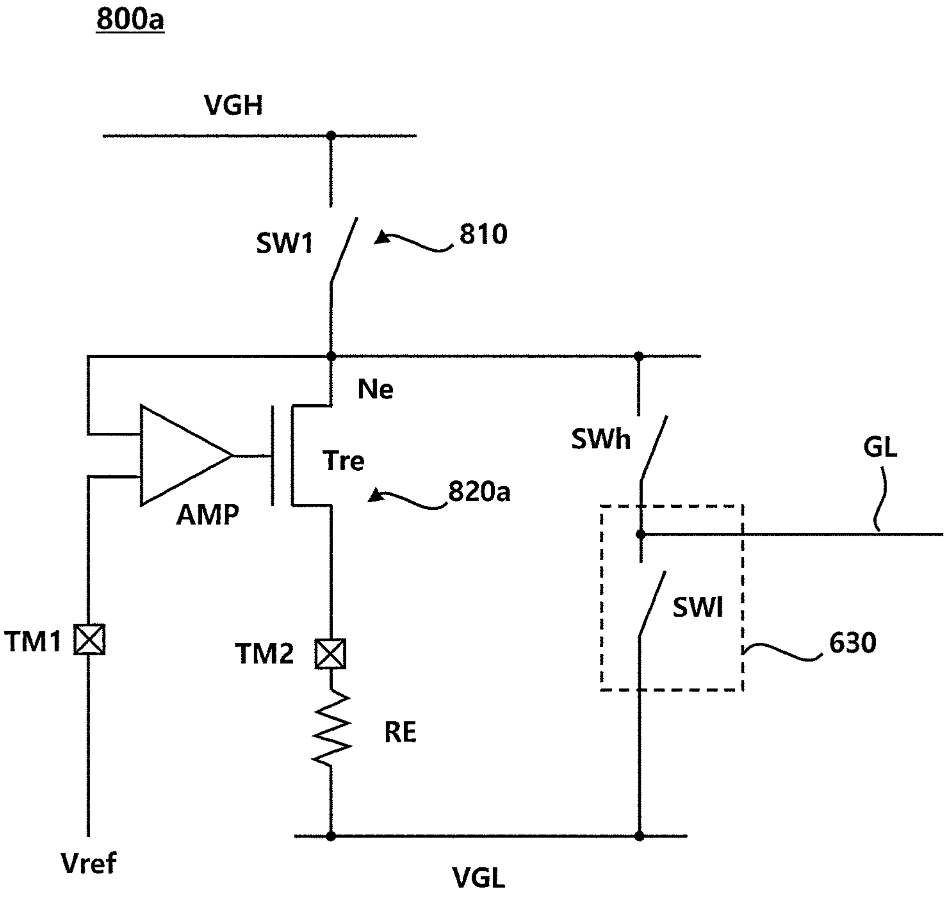
FIG. 8A is a configuration diagram of a third example of a gate driving device in accordance with an embodiment.

FIG. 8A is a configuration diagram of a third example of a gate driving device in accordance with an embodiment.

Referring to FIG. 8A, a gate driving device 800*a* may include a gate high voltage supply circuit 810, a gate line discharge circuit 820*a*, and the like.

The gate high voltage supply circuit 810 may supply the gate high voltage VGH to the discharge node Ne electrically connected to the gate line GL.

The gate high voltage supply circuit 810 may include a first switch SW1 disposed between the discharge node Ne and a supply source of the gate high voltage VGH. Furthermore, the gate high voltage supply circuit 810 may supply the gate high voltage VGH to the gate line GL by turning on the first switch SW1 at the first time T1 of the scan time.

The gate line discharge circuit 820*a* may include a discharge transistor Tre and an amplifier AMP. The discharge transistor Tre and the amplifier AMP may constitute a linear regulator circuit.

The discharge transistor Tre may be disposed between the discharge node Ne and the discharge resistance RE. A drain terminal of the discharge transistor Tre may be connected to the discharge node Ne and a source terminal of the discharge transistor Tre may be connected to the discharge resistance RE.

A first input terminal of the amplifier AMP may be connected to the discharge node Ne and a second input terminal of the amplifier AMP may be connected to the reference voltage Vref. Furthermore, an output terminal of the amplifier AMP may be connected to a gate terminal of the discharge transistor Tre.

According to such a connection structure, the amplifier AMP and the discharge transistor Tre may constitute a LDO circuit that regulates the voltage of the discharge node Ne.

When a voltage of the discharge node Ne is regulated in conformity with the reference voltage Vref, the amount of current flowing through the discharge resistance RE may be maintained to be constant, and thus, the waveform of the scan signal, particularly, the slope in the modulation may have a constant shape.

Furthermore, since the discharge current through the discharge resistance RE does not flow into a line for supplying the reference voltage Vref, but flows into a line for supplying the gate low voltage VGL, the discharge current does not change the reference voltage Vref.

Furthermore, since the reference voltage Vref is connected only to the input terminal of the amplifier AMP, the amount of the current of a line that supplies the reference voltage Vref is reduced and a voltage drop of the reference voltage Vref due to the line resistance hardly ever occurs.

For these reasons, the gate driving device in accordance with an embodiment can maintain the waveform of the scan signal in a constant shape.

Meanwhile, the supply source of the reference voltage Vref, for example, a power supply circuit, may be externally disposed, and may be connected to the amplifier AMP through a first external connection terminal TM1. A user may also change the voltage level of the reference voltage Vref through the supply source externally disposed.

The discharge resistance RE may be externally disposed to be connected to a supply source of the gate low voltage VGL, and may be connected to the discharge transistor Tre through a second external connection terminal TM2. The user may also change the resistance value of the discharge resistance RE externally disposed.

The discharge node Ne may be connected to the gate line GL through a high voltage switch SWh. When the high voltage switch SWh is turned on, the discharge node Ne may be connected to the gate line GL, and when the high voltage switch SWh is turned off, the discharge node Ne may be electrically disconnected from the gate line GL.

The gate driving device 800*a* may further comprise a gate low voltage supply circuit 630 that supplies the gate low voltage VGL to the gate line GL.

The gate low voltage supply circuit 630 may comprise a low voltage switch SW1 that connects the gate line GL and the source for supplying the gate low voltage VGL.

The gate low voltage supply circuit 630 may supply the gate low voltage VGL to the gate line GL by turning on the low voltage switch SW1 and disconnect the gate line GL from the source for supplying the gate low voltage VGL by turning off the low voltage switch SW1.

In the gate driving device 800*a*, the first switch SW1, the amplifier AMP, and the discharge transistor Tre may be disposed outside the display panel and the high voltage switch SWh and the low voltage switch SW1 may be disposed on the panel.

Figure 8B:
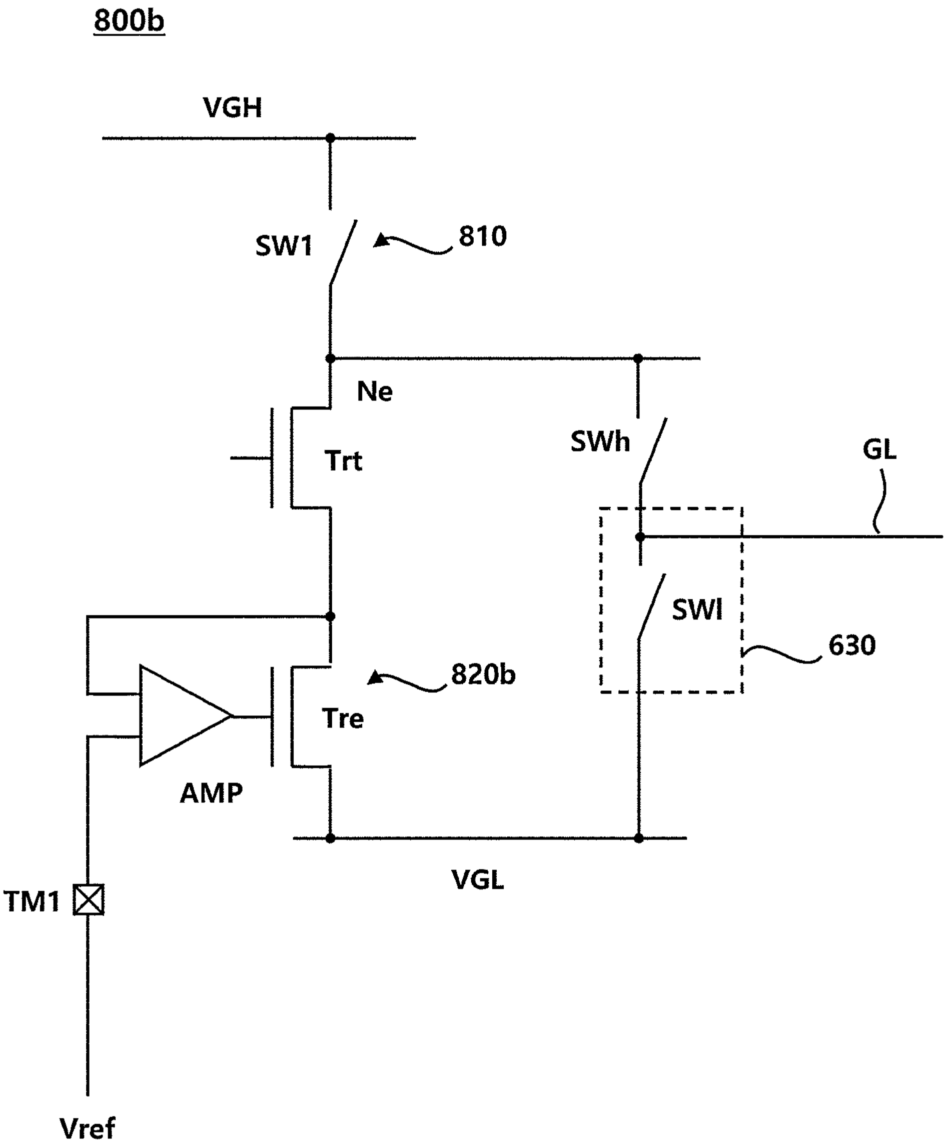
FIG. 8B is a configuration diagram of a fourth example of a gate driving device in accordance with an embodiment.

FIG. 8B is a configuration diagram of a fourth example of a gate driving device in accordance with an embodiment.

Referring to FIG. 8B, a gate driving device 800*b* may comprise a gate high voltage supply circuit 810 and a gate line discharge circuit 820*b*.

The gate high voltage supply circuit 810 may supply a gate high voltage VGH to a discharge node Ne electrically connected with a gate line GL.

The gate high voltage supply circuit 810 may comprise a first switch SW1 disposed between the discharge node Ne and a source for supplying a gate high voltage VGH. The gate high voltage supply circuit 810 may supply a gate high voltage VGH to the gate line GL by turning on the first switch SW1 in a first time of a scan time.

A resistance transistor Trt may be disposed between the discharge node Ne and the gate line discharge circuit 820*b*. The resistance transistor Trt may be electrically connected with the discharge node Ne in its one side, for example a drain, and with the gate line discharge circuit 820*b* in its other side, for example a source.

The gate line discharge circuit 820*b* may comprise a discharge transistor Tre and an amplifier AMP. The discharge transistor Tre and the amplifier AMP may form a linear regulator circuit.

The discharge transistor Tre may be disposed between the gate low voltage VGL and the resistance transistor Trt. A drain terminal of the discharge transistor Tre may be connected with the resistance transistor Trt and a source terminal of the discharge transistor Tre may be connected with the gate low voltage VGL.

A first input terminal of the amplifier AMP may be connected with the other side of the resistance transistor Trt and a second input terminal thereof may be connected with the reference voltage Vref. An output terminal of the amplifier may be connected with a gate terminal of the discharge transistor Tre.

Based on such a connectional structure, the amplifier AMP and the discharge transistor Tre may form an LDO circuit to regulate a voltage of the other side of the resistance transistor Trt.

When the voltage of the other side of the resistance transistor Trt is regulated, the amount of current flowing through the resistance transistor Trt may be maintained to be constant and a waveform of a scan signal, in particular a slope in modulation, may have a constant form. Here, the resistance transistor Trt may operate as a resistance element.

Additionally, since a discharge current does not flow into a line for supplying the reference voltage Vref, but flows into a line for supplying the gate low voltage VGL, the discharge current does not change the reference voltage Vref.

Further, since the reference voltage Vref is connected only to the input terminal of the amplifier, the amount of current flowing into a line for supplying the reference voltage Vref is reduced, and thus, a voltage drop of the reference voltage Vref due to a line resistance would hardly ever occur.

For the reasons described above, the gate driving device according to an embodiment may maintain a waveform of a scan signal to be constant.

A source of the reference voltage Vref, for example a power supply circuit, may be disposed outside and connected with the amplifier through a first external connection terminal TM1. A user may change the level of the reference voltage Vref by using the source disposed thereoutside.

The discharge node Ne may be connected with the gate line GL through a high voltage switch SWh. When the high voltage switch SWh is turned on, the discharge node Ne may be connected with the gate line GL and when the high voltage switch SWh is turned off, the discharge node Ne may be electrically disconnected from the gate line GL.

The gate driving device 800*b* may further comprise a gate low voltage supply circuit 630 to supply a gate low voltage VGL to the gate line GL.

The gate low voltage supply circuit 630 may comprise a low voltage switch SW1 that connects the gate line GL and a source for supplying the gate low voltage VGL.

The gate low voltage supply circuit 630 may supply the gate low voltage VGL to the gate line GL by turning on the low voltage switch SW1 and disconnect the gate line GL from the source for supplying the gate low voltage VGL by turning off the low voltage switch SW1.

In the gate driving device 800*b*, the first switch SW1, the amplifier AMP, and the discharge transistor Tre may be disposed outside the display panel and the high voltage switch SWh and the low voltage switch SW1 may be disposed on the panel.

Figure 9:
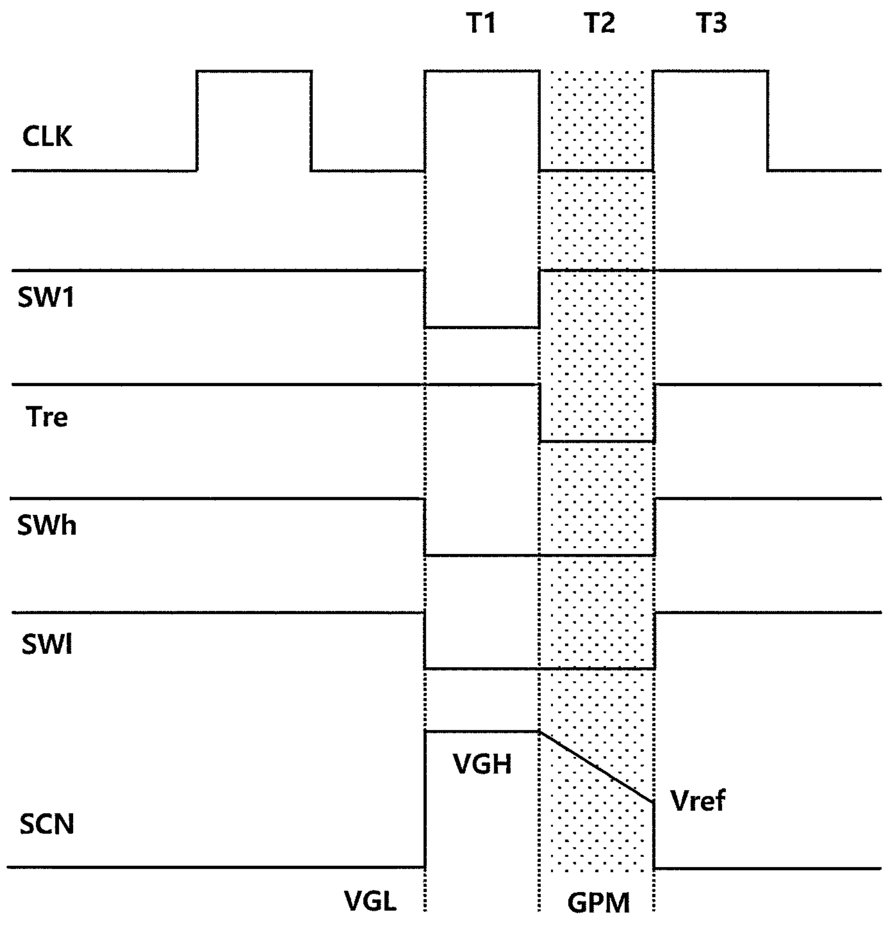
FIG. 9 is a diagram illustrating main waveforms of the examples in accordance with FIG. 8A and FIG. 8B.

FIG. 9 is a diagram illustrating main waveforms of the examples in accordance with FIG. 8A and FIG. 8B.

Referring to FIG. 9, the first switch SW1 may be turned on at the first time T1 of a clock CLK of the scan time for the pixel. Furthermore, the discharge transistor Tre may operate at the second time T2 of the scan time.

At the first time T1, the high voltage switch SWh may be turned on, the discharge node may be connected to the gate line, and the gate high voltage VGH supplied by the gate high voltage supply circuit may be supplied to the gate line.

At the second time T2, the turn-on of the high voltage switch SWh may be maintained, the discharge node may continuously be connected to the gate line, the gate line may be discharged by the gate line discharge circuit, and a voltage of the gate line may be reduced from the gate high voltage VGH to the reference voltage Vref. This time is also called a GPM time.

As the low voltage switch SW1 is turned off at the first time T1 and the second time T2 and then is turned on at the third time T3 subsequent to the second time T2, the gate low voltage VGL may be supplied to the gate line.

Figure 10:
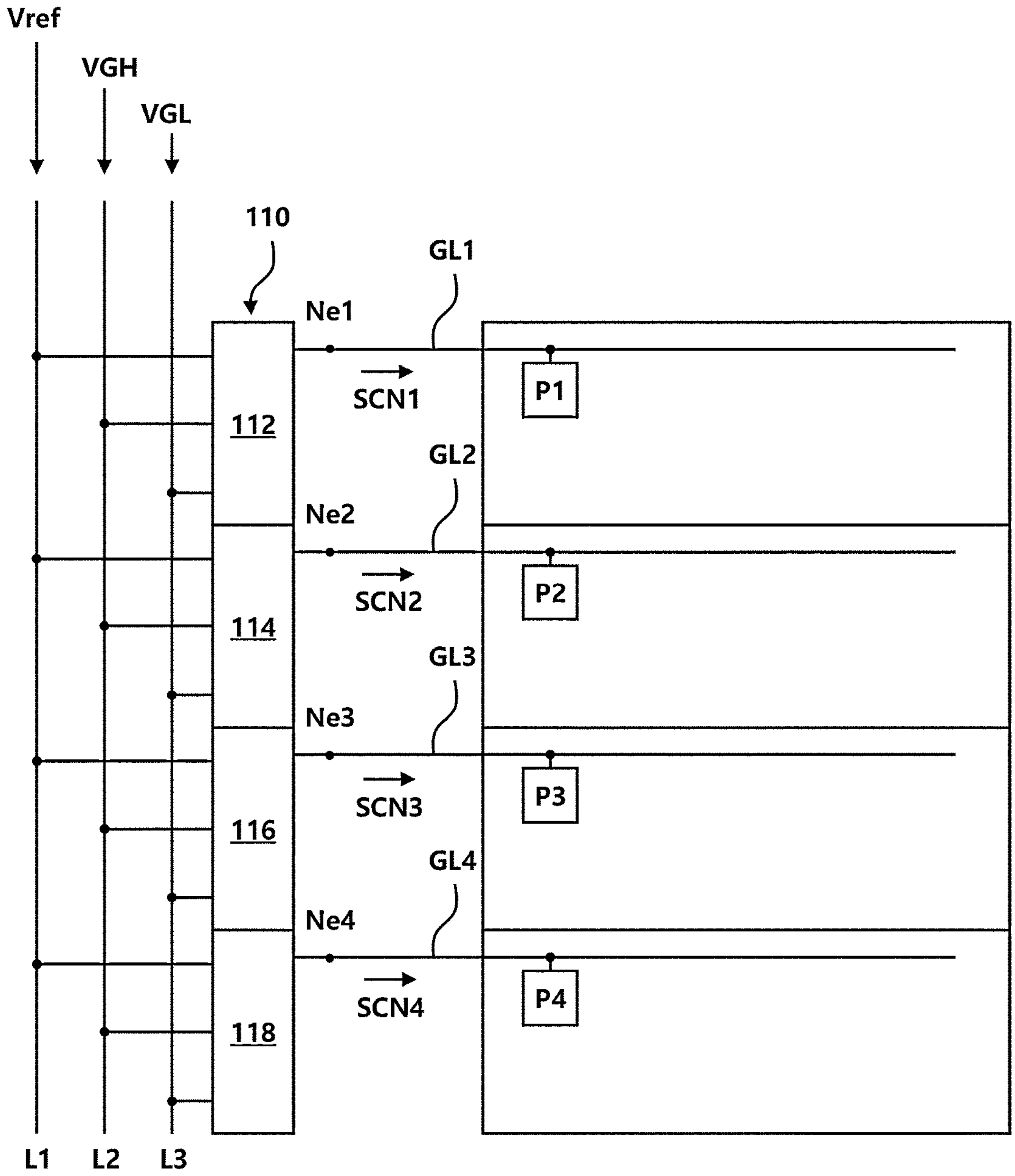
FIG. 10 is a diagram illustrating an example in which a gate driving device in accordance with an embodiment comprises a plurality of gate driving circuits.

FIG. 10 is a diagram illustrating an example in which a gate driving device in accordance with an embodiment includes a plurality of gate driving circuits.

Referring to FIG. 10, a gate driving device 110 may include a plurality of gate driving circuits 112, 114, 116, and 118.

The reference voltage Vref may be supplied through a first line L1, the gate high voltage VGH may be supplied through a second line L2, and the gate low voltage VGL may be supplied through a third line L3.

Each of the gate driving circuits 112, 114, 116, and 118 may receive the reference voltage Vref, the gate high voltage VGH, and the gate low voltage VGL at different positions of the lines L1, L2, and L3.

The first gate driving circuit 112 may supply a first scan signal SCN1 to a first discharge node Ne1 electrically connected to a first gate line GL1 and discharge the first gate line GL1 by regulating the voltage of the first discharge node Ne1 according to a first reference voltage. The first reference voltage may be a voltage formed at a first position of the first line L1.

The second gate driving circuit 114 may supply a second scan signal SCN2 to a second discharge node Ne2 electrically connected to a second gate line GL2 and discharge the second gate line GL2 by regulating the voltage of the second discharge node Ne2 according to a second reference voltage. The second reference voltage may be a voltage formed at a second position of the first line L1.

The third gate driving circuit 116 may supply a third scan signal SCN3 to a third discharge node Ne3 electrically connected to a third gate line GL3 and discharge the third gate line GL3 by regulating the voltage of the third discharge node Ne3 according to a third reference voltage. The third reference voltage may be a voltage formed at a third position of the first line L1.

The fourth gate driving circuit 118 may supply a fourth scan signal SCN4 to a fourth discharge node Ne4 electrically connected to a fourth gate line GL4 and discharge the fourth gate line GL4 by regulating the voltage of the fourth discharge node Ne4 according to a fourth reference voltage. The fourth reference voltage may be a voltage formed at a fourth position of the first line L1.

The gate driving circuits 112, 114, 116, and 118 may receive the reference voltages through different positions of the first line L1 through which the reference voltage Vref is supplied, respectively.

Each of the gate driving circuits 112, 114, 116, and 118 may receive the reference voltage Vref through an input terminal of an error amplifier included therein.

The gate driving circuits 112, 114, 116, and 118 may discharge the gate lines GL1, GL2, GL3, and GL4 by using discharge resistances having different resistance values, respectively. For example, the first gate driving circuit 112 may discharge the first gate line GL1 through a first resistance, and the second gate driving circuit 114 may discharge the second gate line GL2 through a second resistance. The first resistance and the second resistance may have different resistance values.

Transistors of pixels P1, P2, P3, and P4 may be electrically connected to the gate lines GL1, GL2, GL3, and GL4, respectively. For example, a first transistor of a first pixel P1 may be electrically connected to the first gate line GL1, and a second transistor of a second pixel P2 may be electrically connected to the second gate line GL2.

The amounts of discharge currents of the gate driving circuits 112, 114, 116, and 118 with respect to the gate lines GL1, GL2, GL3, and GL4 may be substantially the same as one another. For example, the amount of the discharge current of the first gate driving circuit 112 with respect to the first gate line GL1 may be substantially the same as the amount of the discharge current of the second gate driving circuit 114 with respect to the second gate line GL2.

The scan signals SCN1 to SCN4 may each include a gate pulse, and a partial waveform of the gate pulse may have a shape in which a voltage is gradually reduced due to discharge.

The gate driving circuits 112, 114, 116, and 118 may be formed in different integrated circuits.

Furthermore, the gate driving circuits 112, 114, 116, and 118 may regulate the voltages of the discharge nodes Ne1 to Ne4 through LDO circuits, respectively.

As is apparent from the above, according to the present embodiment, it is possible to implement a panel driving device that meets the development trend of a display panel. Furthermore, according to the present embodiment, it is possible to stably control the waveform of a scan signal generated by a gate driving device. Thus, even when a plurality of gate driving circuits divide a display panel into a plurality of blocks and drive the display panel, it is possible to implement a high-definition screen without causing a deviation for each block.

What is claimed is:

1. A gate driving device for driving gate lines electrically connected to pixels, the gate driving device comprising:

a first gate driving circuit configured to supply a scan signal to a first node electrically connected to a first gate line and to discharge the first gate line by a voltage regulated according to a first reference voltage through a first regulator circuit using the first reference voltage as a reference; and a second gate driving circuit configured to supply a scan signal to a second node electrically connected to a second gate line and to discharge the second gate line by a voltage regulated according to a second reference voltage through a second regulator circuit using the second reference voltage as a reference, wherein the first gate driving circuit includes a first gate low voltage supply circuit including a first switch connected with the first gate line and the first regulator circuit, and the second gate driving circuit includes a second gate low voltage supply circuit including a second switch connected with the second gate line and the second regulator circuit.

2. The gate driving device according to claim 1, wherein the first gate driving circuit and the second gate driving circuit respectively are configured to receive the first reference voltage and the second reference voltage from different positions of a reference voltage line connected to an external power supply circuit for supplying a reference voltage.

3. The gate driving device according to claim 1, wherein the first gate driving circuit and the second gate driving circuit respectively are configured to receive the first reference voltage and the second reference voltage through input terminals of error amplifiers.

4. The gate driving device according to claim 1, wherein the first gate driving circuit is configured to discharge the first gate line through a first resistance and the second gate driving circuit is configured to discharge the second gate line through a second resistance.

5. The gate driving device according to claim 4, wherein the first resistance and the second resistance have different resistance values.

6. The gate driving device according to claim 1, wherein a first transistor of a first pixel is electrically connected to the first gate line and a second transistor of a second pixel is electrically connected to the second gate line.

7. The gate driving device according to claim 1, wherein an amount of a discharge current of the first gate line of the first gate driving circuit is substantially equal to an amount of a discharge current of the second gate line of the second gate driving circuit.

8. The gate driving device according to claim 1, wherein the scan signal includes a gate pulse, and the gate pulse has partial waveforms showing a voltage gradually reduced due to discharge.

9. The gate driving device according to claim 1, wherein the first gate driving circuit and the second gate driving circuit are formed in different integrated circuits.

10. The gate driving device according to claim 1, wherein the first gate driving circuit is configured to regulate voltages through the first regulator circuit including a low-dropout (LDO) circuit which is electrically connected to the first gate low voltage supply circuit, and the second gate driving circuit is configured to regulate voltages through the second regulator circuit including a low-dropout (LDO) circuit which is electrically connected with the second gate low voltage supply circuit.

11. A gate driving device for driving a gate line electrically connected to a pixel, the gate driving device comprising:

a gate high voltage supply circuit configured to supply a gate high voltage to a node electrically connected to the gate line;

a gate low voltage supply circuit configured to supply a gate low voltage to the gate line; and a linear regulator circuit electrically connected with the node and configured to discharge the gate line by a regulated voltage, wherein the linear regulator circuit is configured to receive a reference voltage and operate such that a voltage of one side thereof is regulated in conformity with the reference voltage, another side thereof is electrically connected with the gate low voltage supply circuit, and a resistance element is disposed between the node and the one side.

12. The gate driving device according to claim 11, wherein the gate high voltage supply circuit is configured to operate in a first time of a scan time of the pixel, and the linear regulator circuit is configured to operate in a second time of the scan time of the pixel.

13. The gate driving device according to claim 12, wherein, in a third time following the second time, a gate low voltage from the gate low voltage supply circuit is supplied to the gate line.

14. A gate driving device for driving a gate line electrically connected to a pixel, the gate driving device comprising:

a gate high voltage supply circuit configured to supply a gate high voltage to a node electrically connected to the gate line;

a resistance element connected with the node in its one side;

a gate line discharge circuit comprising a transistor connected with the other side of the resistance element in its one side and an amplifier having a first input terminal electrically connected with one side of the transistor, a second input terminal electrically connected with a reference voltage, and an output terminal electrically connected with a gate terminal of the transistor, and a gate low voltage supply circuit configured to supply a gate low voltage to the gate line from a source of the gate low voltage electrically connected with the other side of the transistor.

15. The gate driving device according to claim 14, wherein the gate high voltage supply circuit comprises a first switch disposed between the node and a source of a gate high voltage, the first switch is turned on in a first time of a scan time of the pixel, and the amplifier operates in a second time of the scan time.

16. The gate driving device according to claim 15, wherein the gate low voltage supply circuit comprises a second switch disposed between the gate line and the source of a gate low voltage, wherein the second switch is turned on in a third time following the second time.

17. The gate driving device according to claim 16, wherein the second switch is disposed on a panel where the pixel is disposed and the transistor and the first switch are disposed outside the panel.

18. The gate driving device according to claim 14, wherein the resistance element is the transistor or other transistors.

19. The gate driving device of claim 1, wherein the first gate driving circuit comprises:

a switch connected between the first node and a different node connected between a first terminal of a discharge transistor and another switch;

the first switch connected between the first node and a terminal for supplying a gate low voltage;

a resistive element connected between the terminal for supplying the gate low voltage and a second terminal of a discharge transistor;

the discharge transistor connected between the resistive element and said another switch;

said another switch connected between the discharge transistor and a terminal for supplying a gate high voltage; and an amplifier having a first input connected to the first reference voltage, a second input connected to the different node, and an output connected to a gate terminal of the discharge transistor.

20. The gate driving device of claim 1, wherein the first gate driving circuit comprises:

a switch connected between the first node and a different node connected between a first terminal of a resistive transistor and another switch;

the first switch connected between the first node and a terminal for supplying a gate low voltage;

a discharge transistor connected between the terminal for supplying the gate low voltage and a second terminal of the resistive transistor;

the resistive transistor connected between a first terminal of the discharge transistor and the different node;

said another switch connected between a terminal for supplying a gate high voltage and the first terminal of the resistive transistor; and an amplifier having a first input connected to the first reference voltage, a second input connected to a node between the first terminal of the discharge transistor and the second terminal of the resistive transistor, and an output connected to a gate terminal of the discharge transistor.

* * * * *